United States Patent Office 3,051,822
Patented Aug. 28, 1962

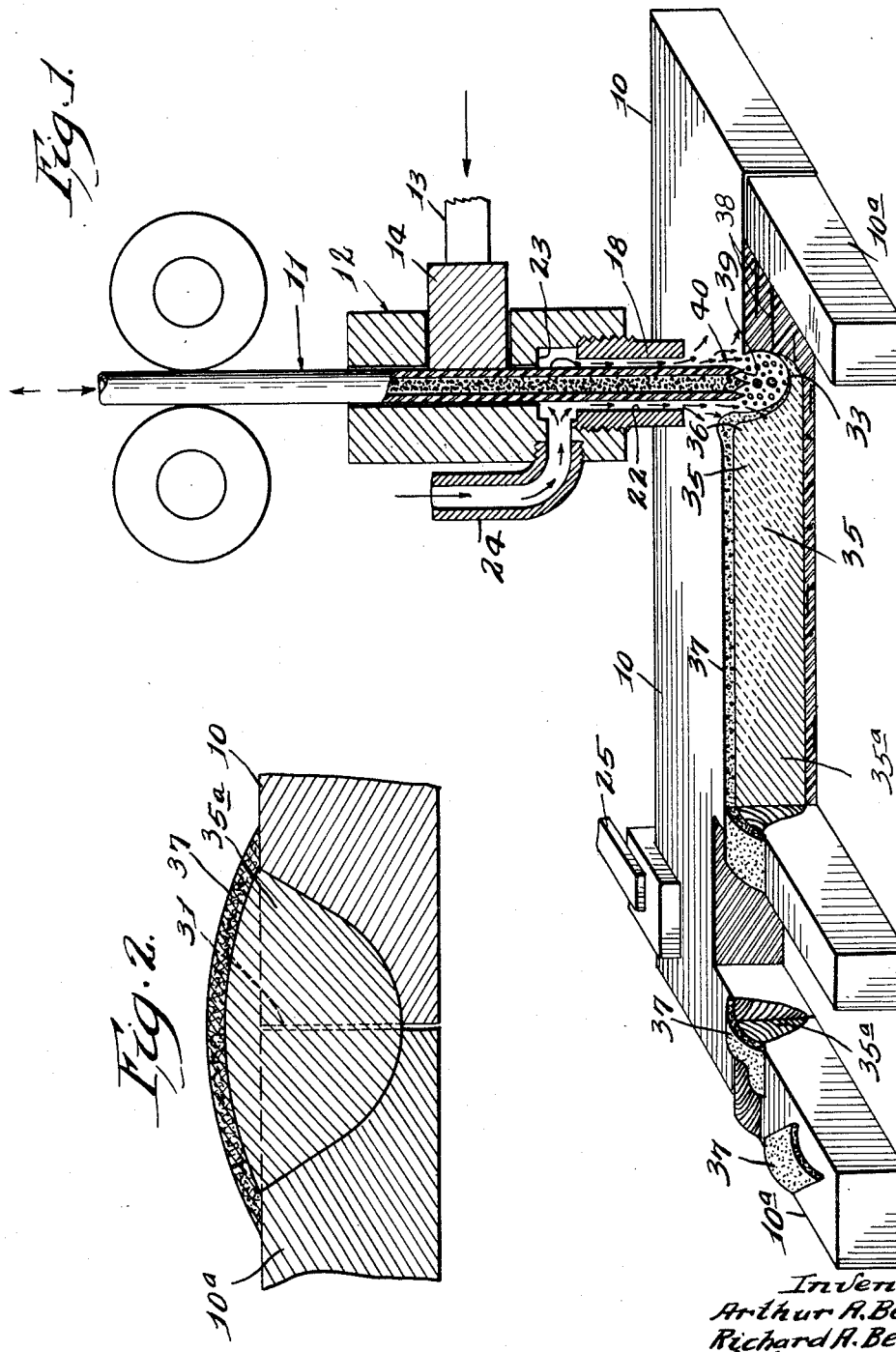

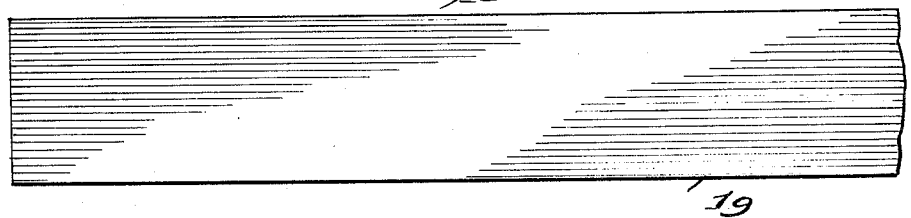
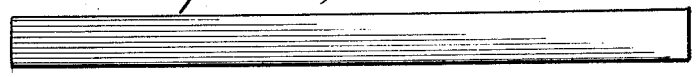
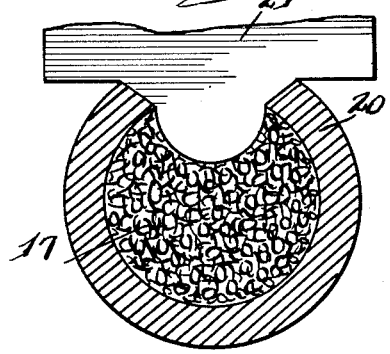 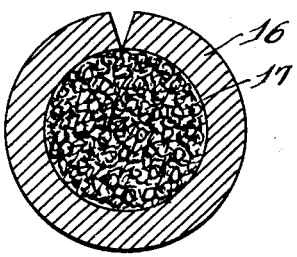 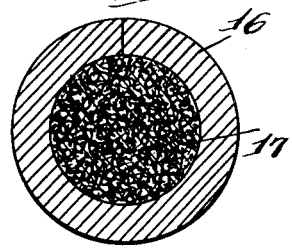
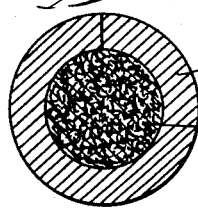 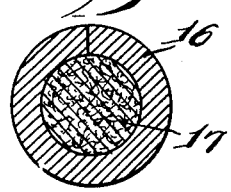 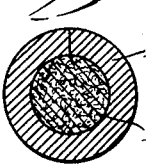 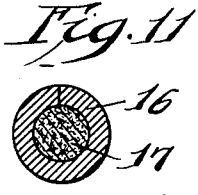
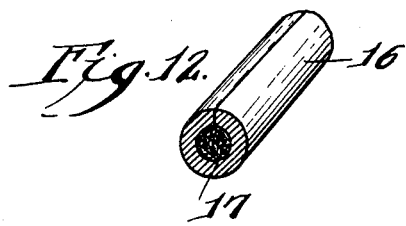

3,051,822
WELDING WITH BLANKET AND GAS ARC-SHIELD
Arthur A. Bernard and Richard A. Bernard, Chicago, Ill., assignors to Chemetron Corporation, a corporation of Delaware
Filed Mar. 23, 1955, Ser. No. 496,260
31 Claims. (Cl. 219—74)

This invention relates to arc welding, and more particularly to consumable electrode arc welding processes and electrodes for use therein in which the electrode is melted during welding to become part of the weld metal.

The new process is particularly useful for mechanized welding and also for welding common steel although not limited to either semi or fully automatic use.

This application is a continuation in part of our copending application Serial No. 409,916, filed February 12, 1954, now abandoned.

The new process employs a dual principle for shielding the welding operation from the harmful effects of atmospheric oxygen and nitrogen, namely, a slag shields the molten weld metal and a gas from a source distinct from the electrode shields the arc column. In the preferred form a tubular type bare surface electrode contains a core of a new type welding composition which, when released within the core of the arc, chemically combines with the chemistry of the shielding gas to produce the chemistry of the process as a whole. The shielding gas may preferably be carbon dioxide and during welding a portion of the oxygen of this gas combines with deoxidizing materials which are part of the core material, converting these materials into oxides to become a portion of the weld metal shielding slag. By having core material absorb oxygen from the $CO_2$ gas, this gas is converted into non-oxidizing carbon monoxide gas, thus making this inexpensive gas suitable for arc shielding purposes.

It is therefore the primary object of this invention to provide a new and improved welding process and an electrode for use in the process.

Another object is to provide a new welding process in which the arc is visible yet shielded from surrounding atmosphere and molten weld metal is shielded by a dense blanket of slag.

A further object is to provide a new welding electrode carrying a flux preconditioned in such a manner that sufficient quantities of weld shielding slag may result from use of the electrode.

Other objects, features and advantages of the invention will be apparent from the following description taken in conjunction with the drawings, in which:

FIG. 1 is a somewhat diagrammatic perspective view, partly in section, of a weld performed in accordance with the present invention;

FIG. 2 is a fragmentary cross-sectional view through the finished weld;

FIG. 3 is a fragmentary plan view of a strip of metal used in forming the electrode shown in FIG. 1;

FIG. 4 is a longitudinal side view of the strip of metal shown in FIG. 3;

FIG. 5 is a fragmentary cross-sectional view of the electrode being filled with a scraper engaging the partially closed electrode;

FIGS. 6 and 7 are successive cross-sectional views of the electrode as it is closed, thereby compressing its fill;

FIGS. 8 to 11 are cross-sectional views of the electrode successively reduced to different sizes; and FIG. 12 is a broken perspective view of a short length of the electrode.

All of FIGS. 4 to 12 are greatly enlarged.

Prior to the present invention there were three types of consumable electrode arc welding processes in general use. Of these three, the process which is the oldest and most extensively used is the flux-shielded electrode process. In this process, the flux is incorporated on the surface of the electrode as a heavy coating and contains carbo-hydrates, and, or, carbonates which then subjected to the heat of the arc emit gases suitable for shielding the arc column. The flux also contains materials which are converted into a slag which blankets and thus shields the molten weld metal.

The second process in order of both age and extensiveness of use is called the submerged-arc welding process. This process uses a plain bare wire electrode and relies entirely on a flux for shielding both the arc column and the molten weld metal. In other words, a gas is not used in any form for shielding either the arc or the molten weld metal and, as the name implies, during welding both the arc column and the molten weld metal are completely submerged under a mound of granular flux, a portion of which is fused and converted into the shielding slag.

The third process is called the gas-shield arc welding process. This process does not use a slag but relies entirely on a gas or a mixture of gases supplied from a source separate from the electrode to shield both the ionized arc column and the molten weld metal. In certain cases, a single stream of gas shields both the arc column and the molten weld metal and in other cases one stream of gas is used to shield the arc column and a second stream or a plurality of gas streams are used to shield the elongated pool of molten weld metal which trails the welding arc.

The prior arc welding methods have undesirable features which have been overcome in the present process. In the order listed above, the flux-shielded electrode process cannot be used in coiled form because of the brittleness and insulating effect of the heavy flux coating. The submerged-arc welding process operates within and under a mound of powdered or granular flux, therefore, although the electrode is a plain bare wire and suitable for use in coiled form, the welding operation is not visible. There is no assurance that the weld is being properly located or that the weld is of the required size or shape. The gas-shielded welding process also uses bare coiled wire electrode but does not efficiently shield the long trailing pools of molten weld metal which result from high speed welding. This process also lacks ability to delay cooling of the weld metal to obtain proper cleansing.

Although not generally considered as such, common steel is one of the most difficult of all metals to arc weld. Common steel contains dissolved oxygen and oxide inclusions which are released during welding to become a free gas. Unless this gas is removed before the weld metal solidifies, the gas remains in the weld metal in the form of porosity. The extent of porosity is proportionate to the amount of dissolved oxygen and oxides in the steel. In other words, an efficient arc welding process must take up the operation of converting iron ore into high quality metal where the steel mills leave off. Of three classifications of steel, that known as killed steel contains very little dissolved oxygen but does contain a considerable amount of oxides. Semi-killed steel contains a troublesome amount of oxygen and the amount varies over a rather wide range. The amount of oxygen normally present in rimmed steel is at the high end of this range. An all purpose arc welding process should be capable of producing high quality, dense, non-porous welds on all three types of steel. The flux-shielded electrode and the submerged-arc processes being slag-shielded and slag refining processes have survived the test of time in doing this, generally, the slagless gas shielded arc welding processes have not.

To handle dissolved oxygen in common steel, and to reduce the included oxides, electrodes containing deoxidizers were developed more than 20 years ago for use with helium and also carbon-dioxide gas-shielded arc welding processes. The deoxidizers were alloyed in the electrode, drawn onto the surface of the electrode, or placed within the core of seamless tubular type electrodes. More recent research has proven that the use of deoxidizing materials alone does not solve the problem because many other conditions must be met. The detailed description of the present invention that follows points out these conditions and the manner in which the present invention solves them.

The preferred form of the invention may be easily understood from FIG. 1. A special electrode 11 of the invention is fed through a torch head 12, by which it is supplied with the welding current from a welding cable 13. A suitable contact shoe 14 is provided for transferring current to the electrode. The main body of head 12 is a conventional copper contact tube such as is generally used with automatic welding. Conventionally, the tube is a replaceable member made of beryllium copper. To complete the welding current circuit a ground cable 25 is attached to the base metal plate 10. Two plates 10 and 10a are shown with square butt edges forming a joint to be welded.

FIG. 1 illustrates one tested form of the new process in approximately true proportions as to the electrode and adjacent torch parts and all dimensions can be calculated based on the electrode being 3/16" diameter.

The head 12 is provided with a removable nozzle 18 forming a gas supply channel 22 surrounding the electrode 11. Channel 22 communicates with chamber 23 in the head which is connected by a pipe or hose 24 to a source of $CO_2$ gas. During welding an inner portion of the carbon-dioxide gas 40 is sucked into the arc stream and thus intentionally is used to oxidize the tip of the electrode.

The heat energy which is jetted from the tip of the electrode is sufficient to form a deep weld crater 33 extending into the surface of the base metals directly below the tip of the electrode. The cavity produced by the jet force of the arc is cylindrical and hence does not have a gradual tapering upward to the rear of the arc as is produced by conventional arc welding processes. Actually, the liquid weld metal 35 at the rear of the arc appears as the crest of a wave 36 and would flow forward and flood the crucible if it was not for the pressure produced by the arc therein. During welding the tip of the electrode is generally flush with or below the surface of the base metal and the trailing weld metal and partially corks the top opening of the crucible confining the energy of the arc therein.

Referring particularly to FIGS. 3 to 12, the illustrated electrode includes a tube 16 formed of the metal to be consumed and transferred to the weld and a core of a new type welding composition or flux 17 substantially uniform along the length of the electrode. The preferred method of insuring uniformity is indicated in FIGS. 3 to 7, illustrating the packing of the comminuted core material in the tube so that it is very highly compressed therein.

Preferably the electrode is made from cold rolled strip steel of proper dimensions to result in a 3/16" diameter electrode when formed into tubular shape. The flat strip 19 shown in FIGS. 3 and 4 is first put through forming rolls to change it into an upwardly open trough-like piece 20 shown in FIG. 5. Core material 17 is placed in the piece 20 and struck off to the proper amount by a doctor blade or scraper 21. Thereafter, the electrode is closed progressively through stages illustrated in FIGS. 6 and 7 to the final stage shown in FIG. 8. Should smaller electrodes be desired, they are successively drawn or rolled down to smaller size through steps as illustrated in FIGS. 9 to 11. The forming steps in making the electrode compacts the core material in place without void spaces along the length of a long coil of electrode.

Although the welding composition must contain ingredients which perform several functions, in regards to the present invention one of the main requirements is that enough slag be produced to not only completely blanket the weld metal but that the blanket be of the required thickness as well. In the case of the flux-coated electrode process there is nothing which limits the amount of materials which may be conveyed to the arc zone by the electrode, to produce the shielding blanket of slag. If more materials are required the thickness of the flux coating is merely increased. The same is the case regarding the submerged-arc welding process, since the flux is entirely separate from the electrode and there is no limit to the amount of granular type welding compound which may be used. In the present invention the amount of flux available is limited because to produce the new process the welding composition may most conveniently be confined within a hole in the electrode which is only a small fraction of the space which would be required for holding a sufficient volume of the type flux used by either the flux-coated electrode or the submerged-arc welding processes.

In the present invention, the problem of packing a sufficient volume of slag forming material in the electrode to produce an adequate volume of weld shielding slag was solved by a combination of three methods, namely, one, instead of packing a mechanical mixture of separate bulky, light weight materials into the electrode to be fused into slag by the heat of the arc during welding, these materials are prefused into a synthesized slag before placing them in the electrode. By so doing, the raw bulky light weight materials are condensed to 1/3 or less of their original bulk or volume. Secondly, the synthesized slag material is reduced in the furnace to where it contains less than its normal amount of oxygen. This further condenses the bulk of the resulting compound and when released at the arc the synthesized material expands into its original volume by absorbing oxygen from the arc shielding separate $CO_2$ gas shield. Thirdly, deoxidizing materials are placed in the flux to combine with available oxygen at the arc temperature to increase volume of materials forming the slag blanket.

Generally, the core material is made up of a mechanical mixture of approximately 50% of the synthesized slag material and 50% deoxidizing and alloying materials. For a given size hole in an electrode, if the raw bulky, light weight, slag forming materials are not reduced beforehand to a synthesized slag, the ratio of the core materials to the metal portion of the electrode would be as low as 5% by weight core materials to 95% electrode metal, whereas by condensing the materials by prefusing, the ratio can be increased to 20% core material to 80% electrode metal. Thus, the raw materials used to make the slag material in the electrode may be reduced to 1/4 in volume following the present invention.

The present process provides for very thorough cleansing of the weld metal. Both the electrode metal and the slag forming materials transfer through the arc in a state so finely divided as to be a spray. It is quite possible that the refining operation of the base metal is completed within the crucible because as the welding operation moves along the seam the crucible in turn moves along the course of welding melting the base metal at the leading side of the crucible. The base metal is transferred to the rear of the arc by passing in a thin film through the crucible where it is subjected to the direct spray of the materials which cleanse and refine the base metal. As the base metal is melted at the leading side of the crucible any dissolved oxygen which may be contained in the base metal is released within the crucible where it is free to escape up and out of the crucible, or, this oxygen is absorbed by the deoxidizers which are part of the core material so that the deoxidizers become oxides and float upward out of the crucible to add bulk to a blanket of shielding slag 37 on the weld metal trailing the arc. Any oxides or dirt contained in laminations 38 in the path of welding are also released and these also flow out of the crucible to the surface of the weld bead 35a where they combine with the blanket of slag.

The core also contains alloying materials, which like the deoxidizing materials are not fused with, but rather, are mechanically mixed with the synthesized slag and these alloys are also jetted into the fused base metal as it transfers through the crucible thus insuring homogeneous alloying. In fact, by turning the arc inside out so to speak, all chemistry is planted at the root of the fusion line, therefore, the refining and alloying is from the bottom up in place of from the top down as is the case of flux-coated electrode and the submerged-arc processes.

Generally, carbon-dioxide gas is not considered suitable for shielding welding arcs because normally this gas oxidizes weld metal and produces porosity. In the present invention, we take advantage of this otherwise intolerable oxidizing condition to produce a spray type arc and to produce oxides used for producing a considerable portion of the weld shielding slag. As previously mentioned, the jet force of the arc sucks in a portion of the $CO_2$ gas which is fed into the arc fusing zone, and as the $CO_2$ gas comes in contact with the tip of the electrode a portion 39 of the electrode metal oxidizes. The surface tension is reduced and the melting point of the electrode metal is lowered which in turn produces a spray type arc. Also, the oxidation increases the rate of deposition for a given welding current density. That portion of the electrode metal which is converted into iron oxide combines with highly efficient deoxidizing materials released within the core of the arc to form even more complete oxides and these float to the upper surface of the molten weld metal to form a considerable portion of the shielding slag. As for example, in one preferred form of core material (Table No. 1) there is no iron oxide, yet analysis shows approximately 17% iron oxide in the blanket of shielding slag. The volume of $CO_2$ gas which is directed toward the arc seems to have no bearing on the volume of $CO_2$ gas which is sucked into the arc, so long as an ample volume of gas is present. For example, with a given diameter electrode, as the welding current is increased or decreased the jet force of the arc in turn is increased or decreased, and in turn the volume of $CO_2$ gas sucked into the arc is proportionally increased or decreased. This is as it should be because as the welding current is increased or decreased the melting rate of the electrode is also increased or decreased and, since the ratio of core material to electrode metal is a fixed ratio, there is always a proper volume of deoxidizing materials released within the core of the arc to prevent the $CO_2$ gas from oxidizing the molten weld metal.

Obviously, those molecules of $CO_2$ gas from which oxygen atoms are removed are converted into carbon-monoxide gas and it is by converting that portion of the $CO_2$ gas which is sucked into the arc column into CO gas, thus making the $CO_2$ gas non-oxidizing, that the use of this inexpensive gas is made possible. It might appear that the shielding gas should be carbon-monoxide gas, however, this is not desirable because, as above mentioned, it is desirable to use the oxidizing effect of the $CO_2$ gas to form a spray type arc and to convert core materials into oxides at the arc during welding to form weld metal shielding slag.

That portion of the deoxidizers in the welding composition used for absorbing oxygen from the $CO_2$ gas may not absorb the oxygen directly from the gas, but rather first the electrode metal may absorb the oxygen at the skirt of the electrode and then the deoxidizers in the core of the arc in turn absorb the oxygen from the electrode metal. Quite possibly, this transformation takes place as the electrode metal is transferring through the arc in an ionized and minute globular form and before it contacts the base metal. In the present invention, this phenomenon was purposely developed and is accurately controlled by the proper balance between the chemistry of the deoxidizers and the separate $CO_2$ gas shield. The oxides produced by this phenomenon, however, are not ample for producing the required volume of weld shielding slag, therefore, as previously mentioned the welding composition in the core of the electrode also includes a synthesized slag for producing the major portion of the shielding slag.

In the cored type electrode preferred in this invention, the overall volume of slag forming materials used is limited by the size of hole in the electrode. It is preferred that the cross-sectional area of the hole be not more than 28% of the overall cross-sectional area of the electrode. The raw materials of the electrode core are prefused not only to condense their bulk, but also to chemically react them before being placed in the electrode. A well balanced slag must also have the proper viscosity so that a uniform thickness of slag over the whole weld bead is produced. It must have the proper density, and if possible the slag must have the characteristics to be self-removing. All of these characteristics cannot be produced to the degree of efficiency which they can be if only one type of oxide or oxygen bearing compound is used but rather, both basic and acid type oxides should be used. When a mechanical mixture of oxygen and hydrogen bearing compounds are subjected to a temperature which will fuse them into a single synthesized compound, a chemical reaction takes place and in so doing large amounts of excess oxygen and hydrogen gases are given up which if released during welding within the arc would produce a weld so porous to be completely valueless. Therefore a very important feature of the present invention is that this chemical reaction is made to take place before welding.

As previously mentioned, we further increase the density of the slag forming materials by carrying the fusing operation beyond the point when the chemical reaction takes place. This is accomplished and controlled by the period of time the melt is held in the furnace in a reducing atmosphere. The longer this condition is held the further the oxide bearing materials are reduced toward their metallic state. By thus increasing the density of the melt in the furnace by partially reducing the oxides, more of the slag forming materials can be packed into the hole of the electrode and, as these reduced oxides are released within the core of the arc they again become balanced neutral oxides by absorbing oxygen from the $CO_2$ arc shielding gas. Expressed in other words, a gas is used for shielding the arc generally considered harmful because of its oxidizing nature, however, materials are fed into the arc which have a greater affinity for the oxygen released from the gas at the temperature of the arc than has the metals being welded and in so doing these deoxidizing materials are converted into shielding slag.

Theoretically, it is not absolutely necessary to prefuse all of the oxygen bearing materials used for producing the shielding slag providing the basic and the acid type materials are in such balance that a chemical reaction does not take place when these materials are fused into a slag during welding. However there are so many variables that it is practically impossible to select and proportion these materials so that a sufficiently perfect balance is maintained.

Another important reason for prefusing the slag forming materials is to make the materials non-hygroscopic so that they will not absorb moisture during storage or when submerged in a water solution during the drawing operation used in making the electrode. To give the slag material produced an anhydrous character, sodium or potassium metasilicate, or sodium or potassium silicate glass, or a suitable lithium compound is added to the slag forming materials before furnace treatment. It will be appreciated that these compounds of sodium, potassium and lithium are compounds of the alkali metals. The materials are then converted into a glass like moisture repellent substance. Also, we have found that the oxides which are reduced in the furnace may not remain stable unless they are converted into a glass like substance by fusing them with a sodium or potassium or lithium compound.

Although the oxides used as slag formers can be sufficiently reduced in the furnace to a point where they will absorb the required amount of oxygen from the $CO_2$ gas to render the gas non-oxidizing, and absorb all oxygen released from the fused base metal as well, we prefer to absorb at least some of the oxygen with materials which are strictly deoxidizers. In the present invention, it is important that these deoxidizers are mechanically mixed with and not chemically combined with the synthesized slag producing compound. Suitable deoxidizers include titanium, aluminum, zirconium, silicon, manganese, etc., either in the commercially pure state or as ferro-alloys. Of these we prefer to use ferro-silicon and ferro-manganese. In that all such ferro-alloys are furnace products (fused) as purchased, it is not necessary to again prefuse them before placing them in the electrode.

Our synthesized slag compound should contain at least one and preferably two or more oxides, such as manganese-oxide, silicon-oxide, zirconium-oxide, aluminum-oxide, calcium-oxide or titanium-dioxide. To convert the oxdes into a glass like material so that it is non-hygroscopic, has the ability to increase the stability of the arc, and to promote desirable slag characteristics, the mechanical mixture which is preferred should contain sodium-metasilicate, or, sodium-silicate glass, or, potassium-metasilicate, or potassium-silicate glass, or, two or more of these materials. By increasing the stability of the arc is meant here greatly improving the metal transfer while greatly reducing arc spatter. It is believed that the alkali metals included in the slag material are a major factor in so improving metal transfer with reduced spatter. The following formula is ideal for welding rimmed steel which contains an unusual heavy thickness of mill scale together with rust.

Mix the following in proportion by weight:

*Table 1*

39.5 parts sodium metasilicate
21 parts manganese dioxide
39.5 parts titanium dioxide This mixture is baked at a temperature of about 900° F. until it ceases to boil. When boiling stops the temperature is increased to approximately 2600° F. and held at this temperature until the total mass liquefies. As the mass starts to liquefy the materials start to combine chemically and during this period large volumes of gas erupt up through the melt. When the chemical reaction stops the liquid mass is still. We prefer to use a gas furnace fired with natural gas and forced air. The complete operation is carried out in a reducing atmosphere. When the chemical reaction has been completed the processing is continued in the reducing atmosphere to further reduce the oxygen content of the melt as a whole. (For example, the reduction of $TiO_2$ to $Ti_2O_3$.) The reducing atmosphere is such that there is approximately 7½% reduction in weight when the material is held for 20 minutes in the reducing atmosphere. It should be understood that the mechanical mixture of the materials can be conditioned to produce quality welding results if the materials are heated at a considerably lower temperature of from 1200° F. to 2200° F. for a proportionally longer period of time. At these lower temperatures we prefer that a lithium bearing compound be used in place of a potassium or a sodium compound because lithium compounds melt at a lower temperature.

The slag produced may have some variation in characteristics depending on the compounds used. The material containing a sodium compound has a higher density and is preferred because the material is quite completely non-hygroscopic. Theoretically, it is possible to dispense with fusing the slag forming materials because, as previously mentioned, if there is an accurate balance between acid and basic oxygen bearing compounds, chemically reacting the mechanical mixture is not definitely essential to produce peak efficiency, however, if even a trace of any material containing hydrogen is used in the formula, prefusing is necessary. It is also desirable that the welding composition be substantially free of carbon.

When the above furnace operation is completed the fused material is poured into open molds to air cool. When solidified, the material is crystalline in structure. The material is divided to particulate form by pulverizing to the required mesh size, preferably to pass through a 30 mesh screen.

The flux or composition placed in the electrode contains the reduced reaction product of slag forming materials as described above plus other compounds. To form the flux mechanically mix:

*Table 2*

27.8 parts of the above synthesized slag compound
25.6 parts of titanium dioxide (prefused as purchased 30 mesh size)
23.3 parts of ferro-manganese (30 mesh size)
23.3 parts ferro-silicon (30 mesh size)

This mixture is now placed in the electrode and packed to a sufficient density so that voids will not result from further compacting under drawing or rolling to which the electrode is to be subjected. The slag ordinarily may range from 40% to 90% by weight of the total welding composition for different applications.

A form of titanium-dioxide found reasonably suitable for use in the above formula is that sold as Ruflux No. 61 or No. 84 by Titanium Corporation of America, however, the impurities in these brands are rather high and we therefore prefer to use the white brand of $TiO_2$. Should the white brand of $TiO_2$ be used, it must be fused into the synthesized slag compound, otherwise the $TiO_2$ would absorb moisture. The resulting mechanical mixture of flux is preferably supplied in the finished electrode so that it is about 15 percent the total weight of the electrode. Other formulas may be supplied in as low a percentage as 6 percent and still other formulas as high as 20 percent.

Although the foregoing is spoken of as a preferred formula for welding common rimmed steel containing a heavy mill scale and rust, it should be recognized that variations in it may be made. As for example, an electrode which contains the above formula produces a very deep penetrating arc and an average width of weld bead when applied with an average welding current density. There are applications where a shallower depth of penetration and a wider than average weld bead are desired. This change can be made by adding a calcium compound to the slag producing materials since calcium increases the ion density of the arc for a given welding current density. This formula would be as follows.

Mix the following in proportion by weight:

*Table 3*

50 parts sodium metasilicate
15 parts calcium metasilicate
35 parts titanium dioxide (white grade)

Bake and fuse this mixture in a furnace at the temperature and for the time given for the previous example.

Continuing with this formula, mechanically mix:

Table 4

15 parts of the above synthesized slag compound
38.4 parts titanium dioxide (fused, 30 mesh)
23.3 parts ferro-manganese (30 mesh)
23.3 parts ferro-silicon (30 mesh)

This mixture is now ready to be placed in the electrode.

It will be noted that the form of titanium dioxide used in the flux determined whether it should be fused into the slag compound. If the material is fused as obtained, there is no necessity to chemically react the material before incorporating it in the electrode. The important consideration is that the slag materials be substantially free of hydrogen since liberation of hydrogen at the arc will create porosity in the weld. Thus, it is herein specified that the slag producing materials should also be chemically inert except for being reduced. Their ability to take up oxygen from the shielding $CO_2$ gas increases the volume of slag obtained and also helps to oxidize the tip of the electrode to produce a spray type arc. While there is disclosed a slag synthetically produced by furnace treating the slag producing materials, there are some raw materials such as granular rutile which are fused as ordinarily obtained. Should the slag producing materials incorporated in the electrode be made entirely of such prefused products, it would, of course, be unnecessary to furnace treat them in order to remove hydrogen to make them chemically inert. It should be understood that whenever the expression "prefused" is used in the claims it is intended to include materials which are fused during the manufacture of the electrode as well as materials which have been fused previously, either by nature or otherwise, and may be mechanically mixed with the other materials associated with the composite electrode.

The present process has several features of operation and result contributing to producing sound welds at high speeds. The arc is visible since only shielded by a gas yet the molten weld metal is protected by a thick blanket of slag impervious to surrounding atmosphere. The arc behavior is quite stable since the $CO_2$ gas oxidizes the tip of the electrode contributing to a fine spray type arc without metal splash. The arc may penetrate quite deeply since it is almost totally enclosed within the metal being fused keeping heat radiation to a minimum.

The new welding flux is so reduced and reacted that it may be placed in the electrode to combine at the arc with the shielding gas to increase its bulk sufficiently to shield the molten metal. Since the flux is planted at the base of the weld crater, the weld metal is cleansed very efficiently. Physical values of the weld metal may be enhanced by the complete alloying effect also. The resultant weld bead is provided with a desirable crystalline structure and a smooth surface contour since the slag blanket retards cooling and has easy removal characteristics.

The physical properties of the welds produced by either of the above two formulas may be altered by adding alloys to the formulas, as for example, vanadium, and, or, molybdenum may be desired in the weld deposit in a percentage of .25 percent. If the welding procedure to be used is such that 2 pounds of base metal is fused and converted into weld metal for each pound of electrode deposited then .75 percent of the metal would be added to the flux. If the alloy was added to the mix as a 50–50 ferro-alloy 1.50 percent of the alloy should be added. Therefore, to produce a weld deposit containing .25 percent vanadium and .25 percent molybdenum, 1.50 percent of the total weight of the electrode should be a 50–50 ferro-vanadium alloy, and 1.50 percent of the total weight 50–50 ferro-molybdenum alloy. On this same basis, if a 2% nickel alloy weld was desired and a commercially pure powdered nickel was used for alloying, 6% of the total weight of the electrode should be powdered nickel.

Although it is contemplated that the tubular electrode would be formed of SAE 1010 or SAE 1015 steel, a quite different steel would be preferred for some purposes, again according to known principles. Also, the hole in the electrode may also contain alloys commonly used for producing hard surfacing electrodes, such as tungsten, or carbide.

The volume of $CO_2$ arc shielding gas consumed by the present invention need be no more than the amount of $CO_2$ gas emitted by a lime base (Type EXXX–15) flux-coated electrode, because in both processes the gas is used for shielding only the arc column, with the molten weld metal shielded entirely by a blanket of slag. The space between the inside diameter of the nozzle 18 and the electrode 11 need be no more than $\frac{1}{16}''$, however, since during welding a considerable amount of metal vapor (not weld metal splash) is emitted from the arc and a small portion of vapor condenses around the mouth of the nozzle which reduces the size of the opening, it is preferred that the space between the nozzle and the electrode be $\frac{1}{8}''$ so that the necessity for removing the condensed metal vapor is less frequent. Depending on the extent of air currents present in the area of welding, the volume of $CO_2$ gas fed into the arc zone can vary from $\frac{1}{4}$ to 1 cubic foot per minute. This would be the case regardless of the diameter of electrode used, or, the amount of welding current used. With the present invention up to one pound of $\frac{3}{16}''$ diameter electrode can be deposited per minute, therefore, with the flow of shielding gas at the upper high point, about one cubic foot of gas, costing one cent, would be consumed for each pound of electrode deposited. As each pound of electrode is deposited about three pounds of base metal are fused and converted into weld metal, therefore, the cost of $CO_2$ shielding gas amounts to only $\frac{1}{4}$ cent for each pound of weld metal produced.

FIG. 2 illustrates a cross-sectional view of the weld. The dotted lines 31 indicate that the $\frac{5}{8}''$ thickness plates were merely butted together and the process penetrating about $\frac{4}{5}$ the unprepared butted plate edges in a single pass. By beveling the edges of 1'' thickness plate, the process can weld this thickness in one pass. With properly prepared edges and by using multiple passes there is no limit to the thickness of base metal that can be welded. The welding speed of the process varies for different plate thicknesses, on metal $\frac{1}{8}''$ to $\frac{5}{16}''$ thick a speed of 100 inches and more can be maintained.

There is practically no reasonable limit to the width and length of molten weld metal that can be maintained. With a welding procedure suitable for welding $\frac{5}{8}''$ thickness butted steel plate employing 1100 amperes, the surface area of the molten pool would be about $\frac{3}{4}''$ wide and $4\frac{3}{4}''$ long. Since the slag shielding compound is incorporated with the metal part of the electrode, as the melting rate of the electrode is increased by increasing the welding current, the volume of synthesized slag feed into the arc by the electrode is inherently commensurately increased to adequately cover and shield the larger area of molten weld metal produced by the increased current.

Table 5 below shows the physical properties of a weld made by a single pass on a $\frac{5}{8}''$ thickness 60° included V butt seam, made with a $\frac{3}{16}''$ diameter electrode with the analysis of core material as shown in Table 2. The welding procedure was 1100 amperes, 32 volts, at a welding speed of 17 inches per minute. The physical properties were taken from a .505'' weld specimen tested in the as welded condition.

Table 5

TYPICAL WELD CHARACTERISTICS

| | |
|---|---:|
| Rockwell hardness of weld "B" scale | 86.6 |
| Ultimate tensile strength (p.s.i.) | 86,550 |
| Yield point (p.s.i.) | 58,540 |
| Elongation in 2 inches (percent) | 28.5 |
| Reduction of area (percent) | 55.45 |

It is our belief that the various theories expounded above with respect to what happens during a welding operation with our improved process and electrode are the correct explanation. However, it should be understood that these theories are presented by way of explanation only and we do not desire to be bound by these theories in the event that future techniques and advances indicate a different explanation for the greatly improved results obtained by the welding process and electrode of the present invention.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. The process of welding with a visible electric arc and consumable electrode, comprising: establishing an electric arc between the electrode and a workpiece; providing relative movement between the electrode and workpiece along a line of weld; enclosing the arc in a transparent shielding medium from a source separate from the electrode to shield the arc from surrounding atmosphere; said electrode carrying to the arc region a mechanical mixture of a deoxidizer and a granular form of glass-like slag material prefused to be essentially hydrogen and carbon free; and transferring said slag through the arc to completely cover the molten metal trailing the arc with a slag blanket shield.

2. The process of electric welding with a visible electric arc and a consumable electrode, comprising: establishing an electric arc between the electrode and a workpiece to form a weld crater; providing relative movement between the electrode and workpiece along a line of weld; enveloping the arc in a shielding gas from a source separate from the electrode to shield the arc from surrounding atmosphere, said gas having available oxygen at the arc temperatures; providing the electrode with prefused slag material being substantially free of hydrogen to be carried into the weld crater, causing a welding composition to be formed in the weld crater including said slag material; and completely shielding molten metal trailing the arc with a slag flowing out of the weld crater.

3. The process of electric welding with a consumable electrode having the external appearance and electrical characteristics of bare wire, comprising: establishing an electric arc between a tubular electrode and a workpiece to form a weld crater; providing relative movement between the electrode and workpiece along a line of weld; enveloping the arc in carbon diode gas from a source separate from the electrode to shield the arc from surrounding atmosphere; providing a flux comprising slag material including at least one alkali metal oxide and at least one silicate prefused together to form a glass-like slag and a deoxidizing material mechanically mixed with the slag in the core of the electrode to be carried into the weld crater, said flux being essentially hydrogen and carbon free; supplying said flux into said weld crater; and completely shielding molten metal trailing the arc with a slag flowing out of the weld crater.

4. The process of electric welding with a consumable electrode, comprising: establishing an electric arc between the electrode and a workpiece to form a weld crater; providing relative movement between the electrode and workpiece along a line of weld; enveloping the arc with a shielding gas flowing from a conduit containing said gas to shield the arc from surrounding atmosphere, said gas containing available oxygen at the arc temperatures; providing the electrode with a mechanical mixture of deoxidizing material, alloying material and a prefused slag material being essentially hydrogen and carbon free; and transferring said slag through the arc to completely shield molten metal trailing the arc with the slag flowing out of the weld crater.

5. The process of electric welding with a consumable electrode having the external appearance and electrical characteristics of bare wire, comprising: establishing an electric arc between the electrode and workpiece to form a weld crater; providing relative movement between the electrode and workpiece along a line of weld; enveloping the arc in a shielding gas from a source separate from the electrode to shield the arc from surrounding atmosphere; providing the electrode with a reduced reaction product of slag producing materials to be carried into the weld crater; and completely shielding molten metal trailing the arc with a slag flowing out of the weld crater.

6. The process of electric welding, comprising: spacing a consumable metal electrode having the external appearance and electrical characteristics of bare wire from a workpiece, said electrode carrying a reduced reaction product of slag producing materials; establishing an electric arc between the electrode and workpiece; enveloping the arc with a shielding carbon dioxide gas from a conduit containing such gas to shield the arc from surrounding atmosphere; and flowing a blanket of slag including said reaction product over the molten metal to completely shield said metal from surrounding atmosphere.

7. The process of electric welding, comprising: spacing a consumable metal electrode having the external appearance and electrical characteristics of bare wire carrying a flux composition from a metal workpiece, said flux containing a prefused slag material, deoxidizing material, and alloying material, at least some of the materials in addition to the slag being prefused; establishing an electric arc between the electrode and the workpiece; enveloping the arc in a shielding gas supplied from a conduit containing such gas; providing relative movement between the electrode and workpiece along a line of weld; and completely shielding the molten weld metal with a slag blanket including some of said materials carried by the electrode.

8. The process of electric welding, comprising: spacing a consumable electrode having the external appearance and the electrical characteristics of bare wire carrying a prefused slag material, deoxidizing material and alloying material from a metal workpiece; establishing an electric arc between the electrode and the workpiece to form a weld crater; enveloping the arc in a gas having available oxygen at the arc temperatures to shield the arc from surrounding atmosphere; providing relative movement between the electrode and workpiece along a weld line; and shielding the molten weld metal exclusively with a slag including impurities in the metal workpiece, slag material from the electrode and slag products of chemical reaction in the weld crater with the arc shielding gas.

9. The process of electric welding, comprising: spacing a consumable electrode having the external appearance and electrical characteristics of bare wire carrying a composition consisting of prefused slag material and furnace product deoxidizing and alloying compounds from a metal workpiece; establishing an electric arc between the electrode and the workpiece forming a weld crater; providing relative movement between the electrode and workpiece along a line of weld; enveloping the arc in the shielding medium to shield the arc from surrounding atmosphere, said medium having available oxygen at the arc temperatures for combining with the deoxidizing compounds carried by the electrode; and shielding molten weld metal trailing the arc with a blanket of slag material flowing out of the weld crater.

10. The process of electric welding, comprising: spacing a consumable tubular type metal electrode from a metal workpiece, said electrode having a core containing a mechanical mixture of a prefused, hydrogen and carbon free slag material and ferro compounds for deoxidizing and alloying, said slag comprising at least one metal oxide and at least one silicate prefused together to produce a glass-like slag; establishing an electric arc between the electrode and workpiece forming a weld crater; depositing electrode metal and the core materials in the weld crater while advancing the crater along a line of weld; shielding the arc from surrounding atmosphere with carbon dioxide gas flowing from a conduit containing such gas; and floating a blanket of slag from the weld crater upon the molten metal trailing the arc to completely shield the molten metal from surrounding atmosphere.

11. The process of electric welding, comprising: spacing a tubular metal electrode from a workpiece, said electrode having an essentially non-hygroscopic core material for shielding molten metal from surrounding atmosphere; establishing an electric arc between the electrode and workpiece; shielding the arc from surrounding atmosphere with carbon dioxide gas flowing from a conduit containing such gas, said electrode core material being substantially free of components capable of emitting a hydrogen gas at the arc; combining some of the electrode core material with a portion of the shielding gas at the arc to increase the volume of said material; providing relative movement between the electrode and workpiece along a line of weld; and shielding molten metal trailing the arc only with a slag including some of said core material.

12. An arc welding electrode for welding steel having a ferrous metal body with an exposed outer surface portion, a flux carried by the body and containing oxides and metallic elements having a greater affinity for oxygen than has steel, the oxides being prefused into an essentially hydrogen and carbon free synthesized slag, the synthesized slag being further reduced to make it oxygen wanting so that during welding the slag may absorb oxygen.

13. The process of electric welding wherein a consumable composite electrode comprising a hollow tubular metal member containing a flux comprising slag material including an alkali metal is spaced from a metal workpiece which comprises establishing an electric arc between said composite electrode and said metal workpiece, releasing said flux into said arc as said electrode is consumed, producing relative movement between said arc and said metal workpiece to produce a mass of molten metal to one side of said arc, and producing an envelope of carbon dioxide around said arm to form an atmosphere encircling said arc, said flux during a welding operation cooperating to produce a slag completely shielding the molten metal trailing said arc.

14. The process of claim 13 wherein said alkali metal comprises sodium.

15. The process of claim 13 wherein said alkali metal comprises potassium.

16. The process of claim 13 wherein said alkali metal comprises a compound of lithium.

17. The process of electric welding with a consumable electrode having the external appearance and electrical characteristics of a bare wire, comprising establishing an electric arc between said electrode and a workpiece to form a weld crater, providing relative movement between the electrode and the workpiece along the line of weld, enveloping the arc in a shielding medium of carbon dioxide gas from a source separate from the electrode, and supplying to the arc region with said electrode a flux comprising slag material including an alkali metal and at least one metal oxide prefused together and a deoxidizing material, said flux during a welding operation cooperating to produce a slag completely shielding the molten metal trailing the arc.

18. The process of claim 1 wherein said transparent shielding medium is carbon dioxide gas.

19. A consumable composite column of welding material for use in a continuous process for arc welding steel wherein the arc is shielded by a curtain of gas, said column having the electrical characteristics of a bare wire and comprising a ferrous metal body, said body holding a flux comprising a reduced reaction product of slag forming materials distributed in a manner to insure continuous release of a substantially uniform quantity of the slag forming materials as said column is consumed, at least some of the flux being prefused, said flux being oxygen wanting so that during an arc welding process said flux combines with available oxygen in the arc region to increase the volume of the slag produced above the volume of said flux held by the ferrous metal body.

20. A consumable composite arc welding column according to claim 19, in which said ferrous metal body is tubular and said flux is contained within said tubular body.

21. For use in an arc welding process for welding steel, a consumable column of arc welding material having a ferrous metal body with an exposed outer surface portion, a flux carried by the body and containing oxides and metallic elements having a greater affinity for oxygen than has steel, the oxides being prefused into an essentially hydrogen free synthesized slag, the synthesized slag being further reduced to make it oxygen wanting so that during welding the slag may absorb oxygen.

22. A consumable composite arc welding electrode for use in a continuous process for arc welding steel wherein the arc is shielded by a curtain of gas, said electrode having the electrical characteristics of a bare wire and comprising a ferrous metal body, said body holding a flux comprising slag forming materials including at least one alkali metal compound prefused together to form a glasslike slag, said metal body carrying said flux to the arc in a manner to insure continuous release of a substantially uniform quantity of said slag forming materials as said electrode is consumed.

23. The electrode of claim 22 wherein said flux includes a deoxidizing material mechanically mixed with the slag material.

24. The process of welding with a visible electric arc and an electrode, comprising: establishing an electric arc between a consumable electrode and a workpiece; providing relative movement between the electrode and workpiece along a line of weld; enveloping the arc in a transparent medium from a source separate from the electrode to shield the arc from surrounding atmosphere; supplying at the arc slag forming materials including at least one alkali metal compound prefused together to form a glasslike slag; causing a welding composition to be formed in the arc region including said slag material, said composition being essentially free of materials capable of forming arc disrupting gas; and forming a slag blanket including said slag material to completely cover the molten metal trailing the arc.

25. The process of welding with a visible electric arc and an electrode, comprising: establishing an electric arc between a consumable electrode and a workpiece, providing relative movement between the electrode and workpiece along a line of weld; enveloping the arc in a transparent medium from a source separate from the electrode to shield the arc from surrounding atmosphere; supplying at the arc slag forming materials including at least one compound of a metal selected from the group consisting of sodium, lithium and potassium, prefused together to form a glasslike slag; causing a welding composition to be formed in the arc region including said slag material, said composition being essentially free of materials capable of forming arc disrupting gas; and forming a slag blanket including said slag material to completely cover the molten metal trailing the arc.

26. The process of electric welding with a consumable composite electrode in the form of a hollow member containing a flux comprising slag material including an alkali metal bearing material, establishing an electric arc between said hollow member and a workpiece to form a weld crater in said workpiece, providing relative movement between the electrode and the workpiece along the line of weld, enveloping the arc in a shielding medium of gas produced from a source separate from the electrode, and supplying to the arc region the flux contained in said hollow member comprising said slag material including an alkali metal bearing material and at least one metal oxide prefused together, said flux during a welding operation cooperating to produce a slag completely shielding the molten metal trailing the arc.

27. The process of welding with an electric arc and an electrode, comprising: establishing an electric arc between said electrode and a workpiece; providing relative movement between the arc and said workpiece along a line of weld; enveloping the arc in a shielding medium derived from a source not part of the electrode to shield the arc from surrounding atmosphere; supplying at the arc from said electrode slag forming materials including at least one alkali metal compound prefused together to form a glasslike slag; causing a welding composition to be formed in the arc region including said slag material, said composition being essentially free of materials capable of forming arc disrupting gas; and forming a slag blanket including said slag material completely to cover the molten metal trailing the arc.

28. The process of welding with an electric arc, comprising establishing an electric arc so that a portion thereof is in intimate contact with a workpiece, providing relative movement between said arc and said workpiece along a line of weld, supplying metal and other materials to said arc from a consumable column of welding material, enveloping said arc in a shielding gas produced from a source separate from said consumable column to shield the arc from the surrounding atmosphere, said other materials supplied to said arc from said consumable column including a prefused slag material, causing a welding composition to be formed in the arc region including said prefused slag material, said composition being essentially free of materials capable of forming arc disrupting gas, and forming a slag blanket including said slag material completely to cover the molten metal trailing the arc.

29. A consumable composite arc welding electrode for use in a continuous arc welding process for producing steel alloy weld material wherein the arc is shielded by a curtain of shielding gas, said electrode including at least one alloying element adapted to form said alloy with steel and having a metal body with an exposed outer surface portion, and a core mixture carried within the metal body containing materials having a greater affinity for oxygen than has the metal being welded including slag forming material comprising at least one oxide, and at least one deoxidizer, said core mixture being essentially hydrogen free and at least a portion thereof being prefused.

30. The consumable composite arc welding electrode of claim 29, wherein the alloying element forms part of the core mixture carried by the metal body of the electrode.

31. The consumable composite arc welding electrode of claim 29, wherein said core mixture comprises from about six to about twenty percent by weight of the total weight of said electrode.

References Cited in the file of this patent

UNITED STATES PATENTS

| | | |
|---|---|---|
| 1,161,366 | Wohlrab | Nov. 23, 1915 |
| 1,277,639 | Pescatore | Sept. 3, 1918 |
| 1,374,711 | Armor | Apr. 12, 1921 |
| 1,589,017 | Lincoln | June 15, 1926 |
| 1,629,748 | Stoody | May 24, 1927 |
| 1,865,169 | Candy | June 28, 1932 |
| 2,043,960 | Jones et al. | June 9, 1936 |
| 2,083,309 | Applegate | June 8, 1937 |
| 2,151,914 | Hopkins | Mar. 28, 1939 |
| 2,350,387 | Cito | June 6, 1944 |
| 2,445,863 | Sarazin | July 27, 1948 |
| 2,504,867 | Muller | Apr. 18, 1950 |
| 2,510,205 | Baird | June 6, 1950 |
| 2,532,410 | Kennedy | Dec. 5, 1950 |
| 2,532,411 | Kennedy | Dec. 5, 1950 |
| 2,544,711 | Mikhalopov | Mar. 13, 1951 |

FOREIGN PATENTS

| | | |
|---|---|---|
| 191,704 | Great Britain | Oct. 11, 1922 |
| 527,009 | Belgium | Sept. 6, 1954 |